United States Patent [19]

Barowski et al.

[11] 3,994,578

[45] Nov. 30, 1976

[54] PROJECTOR WITH A CIRCULAR MAGAZINE

[75] Inventors: Karlheinz Barowski, Hattersheim; Kurt Schubel; Hans Weinhofer, both of Munich, all of Germany

[73] Assignees: Enna-Werk Optische Anstalt Dr. Appelt KG, Munich; Braun Aktiengesellschaft, Frankfurt am Main, both of Germany

[22] Filed: Aug. 2, 1974

(Under Rule 47)

[21] Appl. No.: 494,254

[30] Foreign Application Priority Data

Aug. 2, 1973  Germany............................ 2339257

[52] U.S. Cl..................................... 353/117; 40/79
[51] Int. Cl.².................... G03B 23/06; G09F 11/30
[58] Field of Search.................... 353/117, 115, 111; 40/79

[56] References Cited

UNITED STATES PATENTS

| 3,386,195 | 6/1968 | Pestel et al. ............................ 40/79 |
| 3,554,639 | 1/1971 | Robinson ........................... 353/117 |

*Primary Examiner*—Steven L. Stephan
*Attorney, Agent, or Firm*—Sughrue, Rothwell, Mion, Zinn & Macpeak

[57] ABSTRACT

A circular magazine for photographic slides is provided with a circular segment slider 15 rotatable about the magazine axis to extend a tongue portion 18 over the slide insertion slot 17 in the magazine base plate 14, to thereby close the slot and prevent slides from falling out when the magazine is removed from the projector. Upon insertion in the projector a central hub 24 is rotated whereby its cam surface 25 engages follower 28 on lever 22 to rotate the latter about pivot axis 21. Stop 23 on the end of the lever bears against pin 19' on the segment slider and rotates the latter to open the slot window 17.

5 Claims, 5 Drawing Figures ature circular magazine located on a projector; parts of the magazine and the base plate having been removed to render individual elements of the invention more apparent.
PROJECTOR WITH A CIRCULAR MAGAZINE

BACKGROUND OF THE INVENTION

1. Field of the Invention

The present invention relates to a projector having a rotatably mounted, interchangeable circular magazine arranged above the upper cover plate of its housing. The slides are dropped from this circular magazine into the projector through an opening in the arrested magazine base plate and a corresponding opening in the cover plate of the housing. Alternatively, they are pushed back up into the magazine by the same route.

2. Description of the Prior Art

Known projectors having circular magazines have the disadvantage that one compartment in the circular magazine for holding the slides cannot be occupied by a slide. This empty compartment is located above the opening in the base plate of the magazine. This becomes a disadvantage when all the slides in the magazine are to be projected in succession without interruption or when specific slides are to be selected for projection by means of a special switching device. Manufacture of the circular magazine is also facilitated if all the compartments are constructed in the same way.

SUMMARY OF THE INVENTION

To avoid the above inadequacies and disadvantages, it is proposed according to the invention to produce a projector comprising a circular magazine of the type in question having a circular segment slider arranged above the magazine base plate and rotatable with respect to the same. This circular segment slider is adapted to close the slide insertion slot in the base plate of the projector under the action of a spring when the magazine is removed. When the magazine is replaced on the projector, the slider is adapted to be pivoted back from the region of the slot in the base plate by means of a lever mechanism against the action of a spring.

The circular segment slider which is arranged between an inner and outer annular fin in the magazine base plate is provided with pins which project through curved longitudinal openings located in the base plate. At least one of these pins is located in the effective range of a lever which is swivellably mounted on the housing cover plate of the projector. This rocking lever is preferably adapted to be moved by means of the central magazine locking bolt which extends through the magazine hub and a bearing on the housing cover plate; a spring pressing the lever against the locking bolt. For displacement of the rocking lever, the locking bolt is provided with a control curve against which rests a cam of the rocking lever. When a magazine is placed on the projector, the locking bolt is passed through the magazine hub and magazine bearing and rotated. In the course thereof, the rocking lever is moved sideways by the control curve on the locking bolt, whereupon it displaces the pin on the circular segment slider and the end of the slider closing the slide insertion slot in the magazine base plate is withdrawn so that the slide located above the slot can be lowered immediately the projector is put into operation. After projecting the slides, the last slide to be projected is returned to the circular magazine. When the magazine is removed, the slide insertion slot in the magazine base is automatically closed by the circular segment slider, thereby preventing the slide located over the insertion slot from falling out of its compartment when the magazine is removed from the projector.

The central locking bolt is advantageously axially immobilized in the locking position by means of the rocking lever when the cam of this lever engages in a groove, the base of which is in the form of a control curve. In the locking position, the cam advantageously engages in a detention point to prevent the locking bolt from turning.

To avoid any breakdowns in operation of the device, and to compensate possible tolerances, it is advantageous for the magazine base plate with the circular segment slider to be mounted so that it is slightly displaceable in an axial direction in respect of the magazine body against the action of a spring.

Other objects, features and advantages of the present invention will be made apparent from the following description of a preferred embodiment thereof which is provided in reference to the accompanying drawings.

BRIEF DESCRIPTION OF THE DRAWINGS

FIG. 3b is a partial side view of the embodiment of FIG. 3a.

DESCRIPTION OF THE PREFERRED EMBODIMENT

Figure 1:
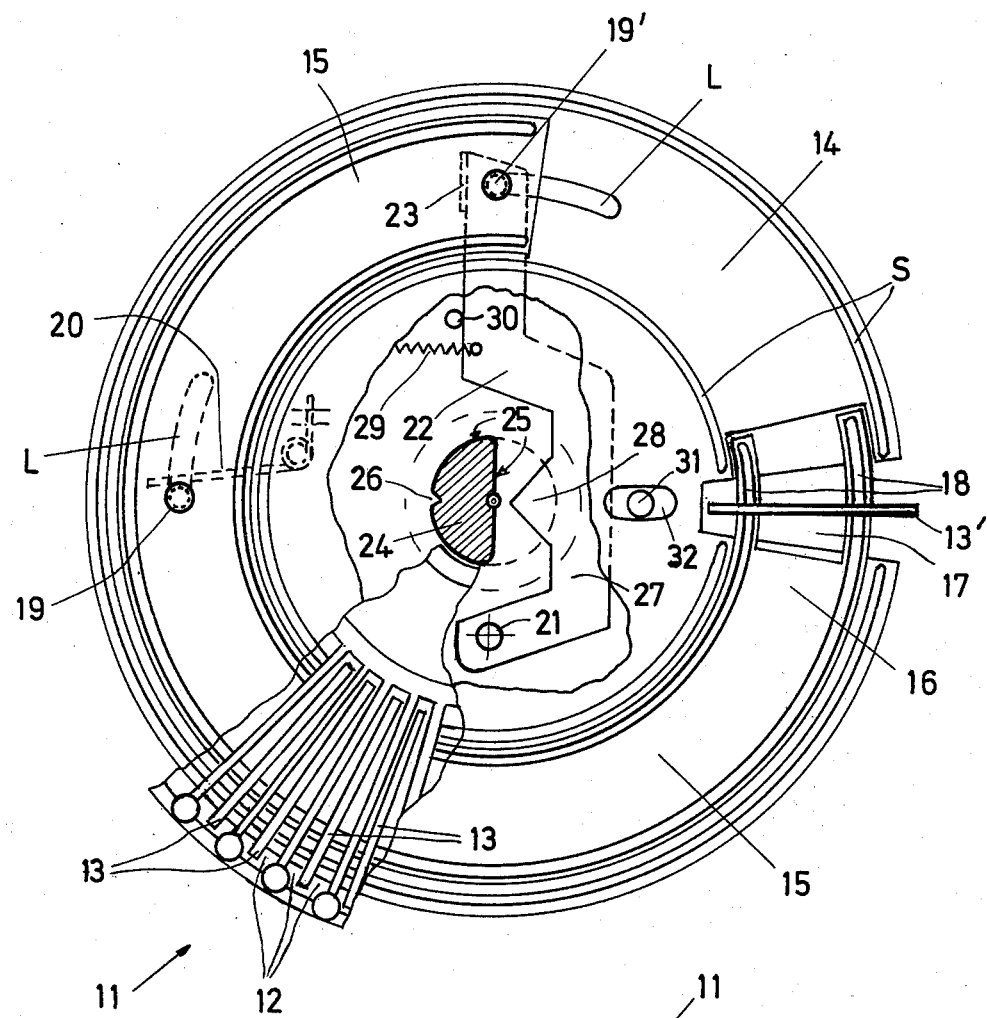
FIG. 1 is a plan view of the circular magazine located on a projector; parts of the magazine and the base plate having been removed to render individual elements of the invention more apparent.
Figure 2:
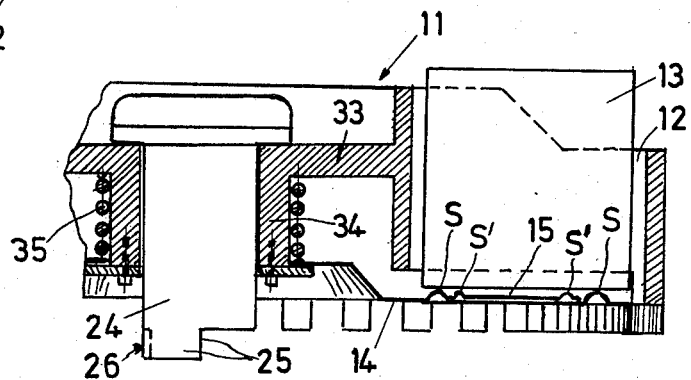
FIG. 2 represents a radial section through a half of the circular magazine.

The circular magazine 11 of the projector comprises on its outer circumference radial compartments 12 for receiving the slides 13 to be projected. The circular magazine is closed on its base by means of the base plate 14 above which a circular segment slider 15 is rotatably mounted between the annular fins S of the base plate 14. When the magazine is not located on the projector, the front end 16 of the circular segment slider 15 closes the slide insertion slot 17 in the base plate 14 by means of the tongue 18 so that the slide 13' located above the opening 17 cannot fall downwards out of the magazine 11.

In the same way as the base plate 14, the circular segment slider 15 is also provided with annular fins S' on which the lower sides of the slides rest. To allow the slides to move freely, the upper edges of the fins S, S' are located in the same horizontal plane and their ends are flat.

The circular segment slider 15 is secured to and rotatably mounted on the base plate 14 by means of the pins 19. The lower ends of the pins 19 pass through the longitudinal openings L in the magazine base plate 14. One of the pins 19 serves as an abutment for the spring 20 which is secured to the base plate 14. The purpose of this spring 20 is to constantly push the slider 15 in front of the opening 17. Another pin 19' acts as a stop for the lever 22 which is swivellably mounted about the bolt 21 on the cover plate of the housing. When the lever 22 is pivoted, the flanges 23 on its ends displace the pin 19' located in its range of movement and the pin 19' rotates the circular segment slider 15. As a result, the tongues 18 on the end 16 are withdrawn and, the slot 17 is opened so that the slide 13' located thereabove can be lowered into the projector.

For the displacement of the rocking lever 22, the magazine locking bolt 24 is provided on its lower end with a control curve 25 in which is located the detention point 26. In the region of the locking bolt 24, the center part 27 of the rocking lever 22 is bent at right angles about the bolt 24 and bears a cam 28 which rests against the control curve 25 and the tip of which engages in the detention point 26 after the locking bolt 24 has been rotated in its locking position. To keep the lever 22 in its defined position, the spring 29 engages on the rocking lever 22 and pulls it against the stop 30.

Figure 3A:
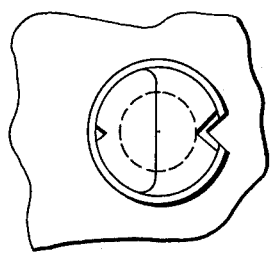
FIG. 3a is a bottom view of an alternative embodiment of the magazine locking mechanism.
Figure 3B:
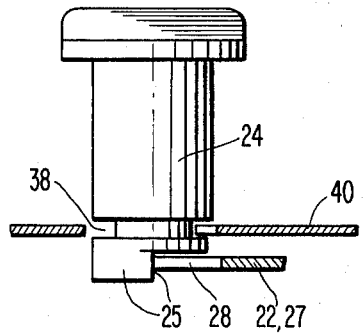
Figure 4:
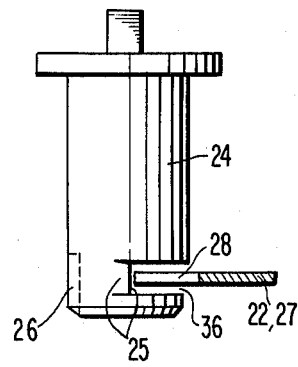
FIG. 4 is a partial side view showing a second alternative embodiment of the magazine locking mechanism.

To secure the magazine locking bolt 24 in an axial direction, the control curve 25 may, for example, be located in a groove 36 so that when the cam 28 engages in the groove, the bolt 24 is simultaneously axially locked in position as shown in FIG. 4. It is also possible to provide a groove on the magazine locking bolt 24 apart from the control curve 25. A locking flange 40 or the like provided on the cover plate of the projector housing can engage in this groove to axially secure the same as seen in FIG. 3.

When the magazine 11 is placed on the projector, the base plate 14 is arrested by the pin 31 arranged on the cover plate of the housing of the projector and passing through the longitudinal opening 32 in the base plate 14 while the magazine body 33 remains rotatable in respect thereof. The base plate 14 is also slightly axially displaceable in respect of the magazine body 33 containing the slide compartments 12. For this purpose, the base plate 14 is rotatably mounted about the hub 34 and is braced against the magazine body by means of the spring 35.

What is claimed is:

1. A circular slide magazine removably attachable to a slide projector comprising:
   a. a stationary base plate having at least one radial slot therethrough to allow passage of a slide from the magazine into the projector, and a plurality of arcuate slots therethrough;
   b. a magazine body rotatably attached to said stationary base plate so as to rotate with respect thereto, said magazine body comprising inner and outer concentric walls connected by radial separator plates to define slide compartments;
   c. a circular segment slider movably attached to said stationary base plate by a plurality of pins protruding through said plurality of arcuate slots through said base plate, said circular segment slider movable about the central axis of said base plate such that in the closed position a portion thereof extends across the radial slot through said base 2. A projector magazine as claimed in claim 1, characterized in that the base plate has inner and outer annular fins (S) thereon and the circular segment slider (15) is located between the inner and outer annular fins (S) in the magazine base plate (14) and has annular fins (S) thereon which do not project beyond the base plate and wherein the ends of the annular fins (S,S') are flattened.

3. A projector magazine as claimed in claim 1, further comprising a locking flange on the cover plate of the projector housing wherein said magazine locking bolt has a groove thereon such that when said magazine locking bolt is rotated, said locking flange engages said groove to prevent axial movement of the locking bolt.

4. A projector magazine as claimed in claim 1, wherein the control curve (25) on the magazine locking bolt (24) is located in a groove in which the cam (28) on the rocking lever (22) engages to prevent axial movement of said locking bolt.

5. A projector magazine as claimed in claim 1 further comprising spring means interposed between the magazine base plate (14) and the magazine body so as to permit axial movement of the base plate (14) with respect to the magazine body (33).

* * * * *